United States Patent
Kinouchi et al.

[11] Patent Number: 5,727,091
[45] Date of Patent: Mar. 10, 1998

[54] VIDEO DECODER SYSTEM

[75] Inventors: Shigenori Kinouchi; Akira Sawada, both of Tokyo, Japan

[73] Assignee: NEC Corporation, Tokyo, Japan

[21] Appl. No.: 614,474

[22] Filed: Mar. 13, 1996

[30] Foreign Application Priority Data

Mar. 17, 1995 [JP] Japan .................. 7-057844

[51] Int. Cl.$^6$ .................. G06K 9/00
[52] U.S. Cl. .................. 382/246; 382/250
[58] Field of Search .................. 348/398, 413, 348/416, 699, 700, 423, 426, 715, 384, 396, 420; 386/81, 111, 68; 382/232, 233, 235, 236, 238, 239, 240, 244, 245, 246, 248, 250, 251, 252, 253, 234, 305, 307, 276

[56] References Cited

U.S. PATENT DOCUMENTS

| | | | |
|---|---|---|---|
| 5,293,229 | 3/1994 | Iu | 348/415 |
| 5,329,365 | 7/1994 | Uz | 348/469 |
| 5,398,072 | 3/1995 | Auld | 348/426 |
| 5,506,621 | 4/1996 | Ogasawara et al. | 348/396 |
| 5,537,215 | 7/1996 | Niimura et al. | 358/335 |
| 5,543,932 | 8/1996 | Chang et al. | 358/335 |
| 5,563,660 | 10/1996 | Tsukagoshi | 348/384 |
| 5,565,920 | 10/1996 | Lee et al. | 348/398 |

FOREIGN PATENT DOCUMENTS

| | | | |
|---|---|---|---|
| 0 675 656 A2/A3 | 10/1995 | European Pat. Off. | H04N 7/58 |
| 96104130 | 2/1997 | European Pat. Off. | |

OTHER PUBLICATIONS

MPEG1 Standard, Recommendation ISO/IEC–11172–2 (1993); pp. 89–129. No Author. No Place of Publication.

D. Brinthaupt, et al. "A Video Decoder for H.261 Video Teleconferencing and MPEG Stored Interactive Video Applications", 1993 IEEE International Solid–State Circuits Conference, Feb. 1993, pp. 34–35.

*Primary Examiner*—Leo Boudreau
*Assistant Examiner*—Bi Jan Tadayon
*Attorney, Agent, or Firm*—Whitman, Curtis, Whitman & McGinn

[57] ABSTRACT

A timing signal generator of an MPEG video decoder is responsive to a picture type signal for selectively generating one of a timing signal for decoding I and P pictures and a timing signal for decoding a B picture within a predetermined period of time, permitting an increased speed for the B picture decoding.

5 Claims, 8 Drawing Sheets

□ : I PICTURE
△ : P PICTURE
✕ : B PICTURE

VIDEO DECODER SYSTEM

BACKGROUND OF THE INVENTION

The present invention generally relates to a system for decoding an encoded video signal, and particularly, to a video decoder system for decoding a sequence of motion picture data, as it is encoded in accordance with an MPEG standard.

DESCRIPTION OF THE RELATED ART

For a standardization of an inter-frame prediction coding of video signals such as for a TV, some drafts have been prepared by the Moving Picture Expert Group and examined by the ISO/IEC, JTC1/SC2/WGB.

Among them, that one which provides for a decoder system has been provided for as an MPEG1 standard (hereafter simply "MPBG") in the Recommendation ISO/IEC-11172-2 (1993), see FIGS. 6 to 8 and Tables 1 to 4.

An MPEG video decoder system is adapted to decode a code sequence comprising a sequence header (hereafter "SH") and a substantially independent group of pictures (hereafter "GOP"), as it is a sequence layer formatted to the MPEG by an MPEG video encoder system.

Under the sequence layer, the MPEG provides for a GOP layer consisting of three types of pictures: an intra-frame coded picture (hereafter sometimes "I picture") assuring an independency of the COP, an inter-frame forward-directionally predictive picture (hereafter sometimes "P picture") of which prediction needs a past I or P picture to be refererred to, and a bidirectionally predictive picture (hereafter sometimes "B picture") of which a prediction needs a past I or P picture and a future P picture to be referred to.

In this respect, the MPEG video decoder system is necessarily adapted to decode any and all of the three types of pictures.

A typical conventional video decoder system for decoding a GOP, i.e. an MPEG-formatted bitstream, has a decoding rate of one picture per one frame, whereas for the B picture to be scanned, the system employs a pair of scan memories either for writing data therein and the other for reading data therefrom, in an alternating manner.

This is due to an inherent difference between an order of pictures to be processed and an order of reproduced pictures to be equivalent to that of original pictures.

For example, letting N (number of pictures in a GOP to be processed)=15, M (period for an occurrence of I or P picture in the GOP)=3 and Ii, Pi or Bi be an I, P or B picture located at an arbitrary i-th position in a sequence of reproduced pictures (hereafter sometimes "outputs" or {O}), such that:

"B0-B1-I2-B3-B4-P5-B6-B7-P8-B9-B10-P11-B12-B13-P14", the GOP has a picture sequence such that:

"I2-B0-B1-P5-B3-B4-P8-B6-B7-P11-B9-B10-P14-B12-B13".

In other words, assuming Ij, Pj or Bj are an I, P or B picture at an arbitrary j-th order to occur as a picture in a picture sequence of a GOP such that:

"I0-B1-B2-P3-B4-B5-P6-B7-B8-P9-B10-B11-P12-B13-B14", a reproduced picture sequence {O} has corresponding pictures rearranged such that:

"B1-B2-I0-B4-B8-P3-B7-B8-P6-B10-B11-P9-B13-B14-P12".

It will be seen that letting k=[j/3], where [x] means a largest integer not exceeding x, it so follows that:

GOP={P(3k),B(3k+1),B(3k+2); k=0 to 4} and

{O}={B(3k+1),B(3k+2),P(3k); k=0 to 4}, providing that P0=I0.

FIG. 1 is a block diagram of a conventional video decoder system of such a type.

The conventional system includes a demultiplexing decoder 1 for Huffman-decoding a sequence of input picture data DI, as they are MPEG-formatted, an inverse quantizer 2 for inverse-quantizing a set of Huffman-decoded data, and an inverse discrete cosine transform (hereafter "IDCT") section 3 for performing an IDCT of inverse-quantized data to provide a set of inverse-transformed data IT as ac-component data for P and B pictures or de-component data for an I picture.

Assuming a suffix "a" representing an ac-component (i. e. a pixel data difference between an original picture and a prediction picture) and a suffix "d" representing a dc-component (i.e. a pixel data of prediction picture), the data set IT has a picture sequence, e.g.:

IT={Pa(3k),Ba(3k+1),Ba(3k+2); k=0 to 4}, providing that Pa(3k)=Ia(3k)=Id for k=0 and an ideal relationship between a coding and a decoding.

The conventional system further includes an adder 4 for adding the inverse-transformed data IT to a set of type-dependent prediction data DR as de-component data for the P and B pictures or zero-value data for the I picture, to provide a set of reproduced pixel data PI and PP on the I and P pictures to be alternatively stored in a pair of frame memories 8 and 9, and a set of reproduced pixel data PB on the B picture to be alternatively stored in a pair of scan memories 10 and 11.

The data set DR should have a corresponding picture sequence to the data set IT, e.g.:

DR={Pd(3k),Bd(3k+1),Bd(3k+2); k=0 to 4}, providing that Pd(3k)=Id(3k)=0 for k=0.

Therefore, the adder 4 is provided with a prediction signal select switch Sw1 responsive to a select signal MT supplied as a macroblock level picture-type identifier from the decoder 1, for a selection among an inter-framer forward MC (motion compensation) prediction signal M1 from an MC unit 6 of a half-pel (i.e. half pixel) accuracy, an inter-frame backward MC prediction signal M2 from another MC unit 7 of a half-pel accuracy, an inter-frame bidirectional MC prediction signal MPI as a mean value from an average calculator 5, and an intra-frame prediction signal.

The MC units 6 and 7 are responsive to a decoded motion vector signal MV supplied from the decoder 1, for executing half-pel MC's of I and/or P pictures P(3k) and P(3k+3) in a previous frame, as they are read from the frame memories 8 and 9, respectively.

The system of FIG. 1 further includes a picture select switch Sw2 responsive to a select signal PT supplied as a picture sequence identifier from the decoder 1, for a selection among I and/or P pictures F1/0 and F2/0 and a B picture 0B in a current frame, as they are each scanned, single or double, to be read from a corresponding one of the frame and scan memories 8 to 10, to be output as {O}, and a timing generator 12 for generating a timing signal K for a decoding control.

FIG. 2 shows a time chart of various signals in the system of FIG. 1, assuming that M=4.

Letting Ip, Pq and Br be a p-th I picture, a q-th P picture and an r-th B picture in a GOP, it is now assumed that the input code sequence DI formatted to the MPEG has a picture sequence such that:

"I1-P1-B1-B2-B3-P2- ...".

In accordance with the control by the timing signal K, there are MC-prediction decoded I, P and B pictures (i.e. PI, PP and PB), of which the I and P pictures (e.g. I1, P1, P2, ...) are written by a sequential line scan (hereafter "block scan") at a rate of 30 fields (30 frames) per second, alternately into the frame memories 8 and 9, wherefrom they are read by a two-to-one line jump scan (hereafter "raster scan") at a rate of 60 fields (30 frames) per second, alternately providing data F1, F2 corresponding to reference pictures for MC and data 0 (e.g. 0I1), 0 (e.g. 0P1) corresponding to reproduced pictures to be output. The B pictures (e.g. B1, B2, B3, ...) are alternately written to the scan memories 10 and 11, wherefrom they are alternately read as data 0B (e.g. 0B1, 0B2, 0B3) to be output.

The MC-prediction decoding in MPEG (coding: 30 fields/s) is executed at a rate of one picture per frame. Therefore, as shown in FIG. 2, in application to an NTSC system (display: 60 fields/s), there occur ovalaps (eg. TL1, TL2) between neighboring periods (e.g. Tb1, Tb2, Tb3) for processing data of B pictures (e.g. B1, B2, B3) to be each written to a scan memories 10, 11 and raster-scanned to be twice read therefrom to output.

Namely, an end portion (e.g. TL1) of a current write/read process (e.g. Tb1) overlaps a head portion (e.g. TL1) of a subsequent write/read process (e.g. Tb2), which means that, if a single scan memory is provided, either process (Tb1 or Tb2) has to be put in a waiting state, or alternately the subsequent process (Tb2) has to be delayed to eliminate an overlap, and a next one (Tb3) thereto as well.

To avoid such an undesirable delay accumulation, the conventional system employs the two scan memories 10 and 11 so that write/read operations can be made in an alternating manner, i.e. on one memory 10 for B1 picture, on the other memory 11 for B2 picture and on the memory 10 for B3 picture, outputting a picture sequence such that:

"0I1-0I1-0B1-0B1-0B2-0B2-0B3-0B3-0P1-0P1-0P2 ...".

Necessary storage capacity for frame and scan memories (=4 frames) is calculatable such that:

352 (dots)×288 (lines)×8 (bits)×1.5 (Y+Cb+Cr)×4 (frames)=4,866, 048 (bits).

Like this, the conventional system needing two scan memories for B pictures tends to have a relatively large storage capacity, resulting in an enlarged expensive system.

The present invention has been achieved with such points in mind.

SUMMARY OF THE INVENTION

It therefore is an object of the present invention to provide a video decoder system having a reduced storage capacity.

To achieve the object, a genus of the present invention provides a video decoder system comprising a decoder means for Huffman-decoding a set of Huffman-coded picture data, an inverse quantization means for inverse-quantizing the Huffman-decoded data, an inverse discrete cosine transformation means for inverse-discrete-cosine-transforming the inverse-quantized data to provide a set of first data, an adder means responsive to a first selection signal from the decoder means, for adding a selected one of prediction data sets to the set of first data to provide a corresponding one of first, second and third picture data sets representing pictures of first, second and third types, respectively, first and second frame memories accessible for alternatively writing therein data of the first and second picture data sets in frames by a predetermined block scan and reading therefrom the same in a predetermined raster scan order, a third frame memory accessible for writing therein data of the third picture data set in frames by the predetermined block scan and reading therefrom the same in the predetermined raster scan order, and a timing signal generation means for generating a timing signal for a timing control of the video decoder system, wherein the timing signal generation means includes a timing signal select means responsive to a picture type signal indicating an arbitrary one of the first, second and third types for selectively generating one of a first said timing signal for decoding the first and second picture data sets and a second said timing signal for decoding the third picture data set within a predetermined period of time.

Therefore, according to the genus of the invention, a video decoder system is permitted to have a single scan memory for effectively processing a third picture data set within a predetermined period of time, without a conventional need of delay.

According to a species of the genus of the invention, the predetermined block scan comprises a sequential line scan, the predetermined raster scan comprises a two-to-one line jump scan, and the predetermined period comprises at least a half of a scan period of one of the frames minus a period for one line of the predetermined block scan.

BRIEF DESCRIPTION OF THE DRAWINGS

The objects, features and advantages of the present invention will become more apparent from consideration of the following detailed description, in conjunction with the accompanying drawings, in which.

DESCRIPTION OF THE PREFERRED EMBODIMENTS

Figure 1:
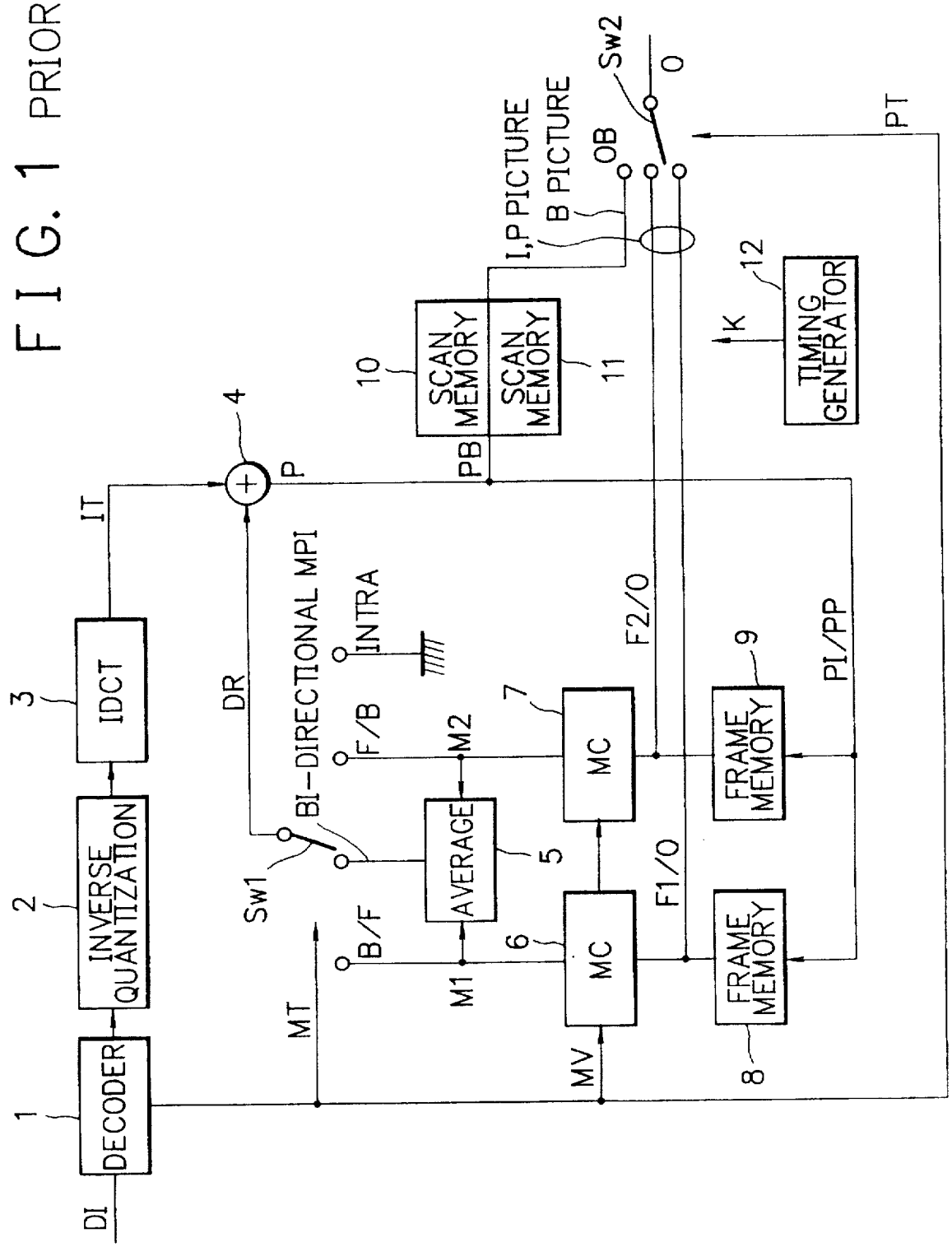
FIG. 1 is a block diagram of a conventional video decoder system.
Figure 2:
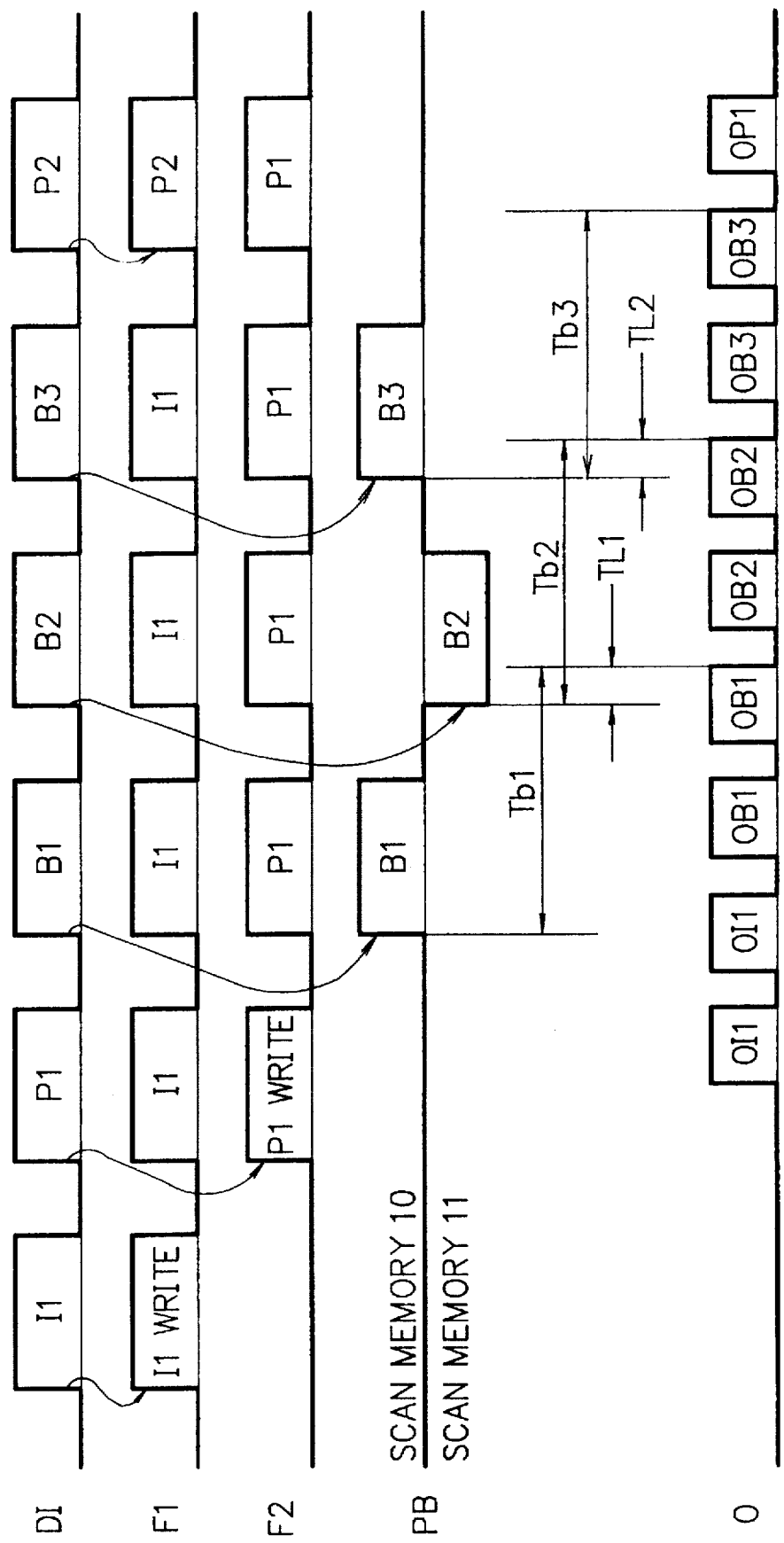
FIG. 2 is a time chart of various signals in the system of FIG. 1.

There will be detailed below preferred embodiments of the present invention, with reference to the accompanying drawings. Like members are designated by like reference characters.

Figure 3:
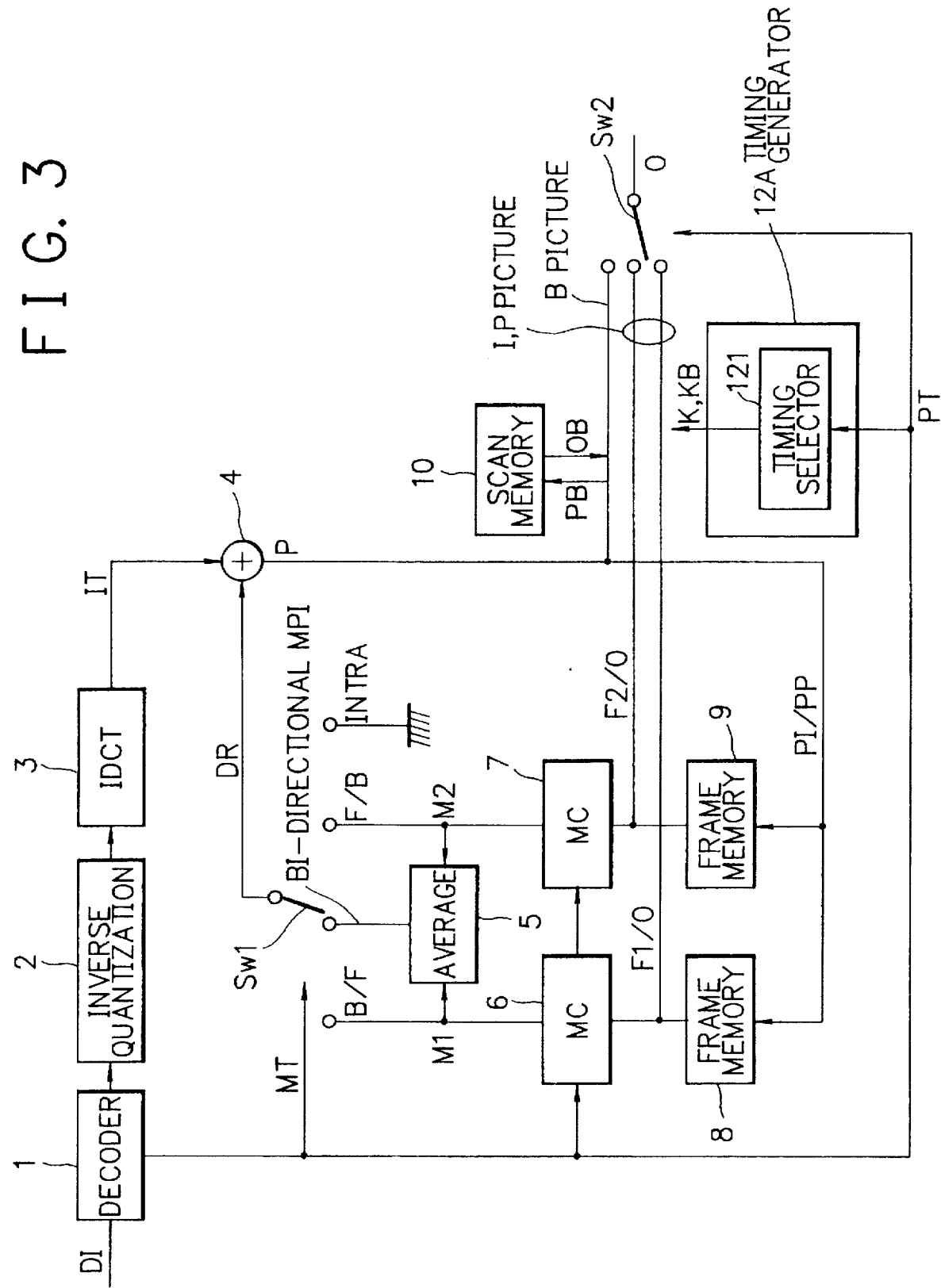
FIG. 3 is a block diagram of a video decoder system according to an embodiment of the invention.

FIG. 3 is a block diagram of a video decoder system according to an embodiment of the invention.

The video decoder system of FIG. 3 comprises a decoder 1, an inverse quantizer 2, an IDCT section 3, an adder 4, an average calculator 5, a pair of MC units 6 and 7, a pair of frame memories 8 and 9, a single scan memory 10, and a pair of select switches Sw1 and Sw2, like the system of FIG. 1.

The system of FIG. 3 further comprises a timing signal generator 12A including a timing selector 121 which is responsive to a picture type signal PT supplied from the decoder 1, representing an I, P or B picture type, for selectively generating one of a timing signal K for decoding I and P pictures in a similar manner to the system of FIG. 1 and a timing signal KB for decoding B pictures at a higher speed than the signal K.

Figure 4:
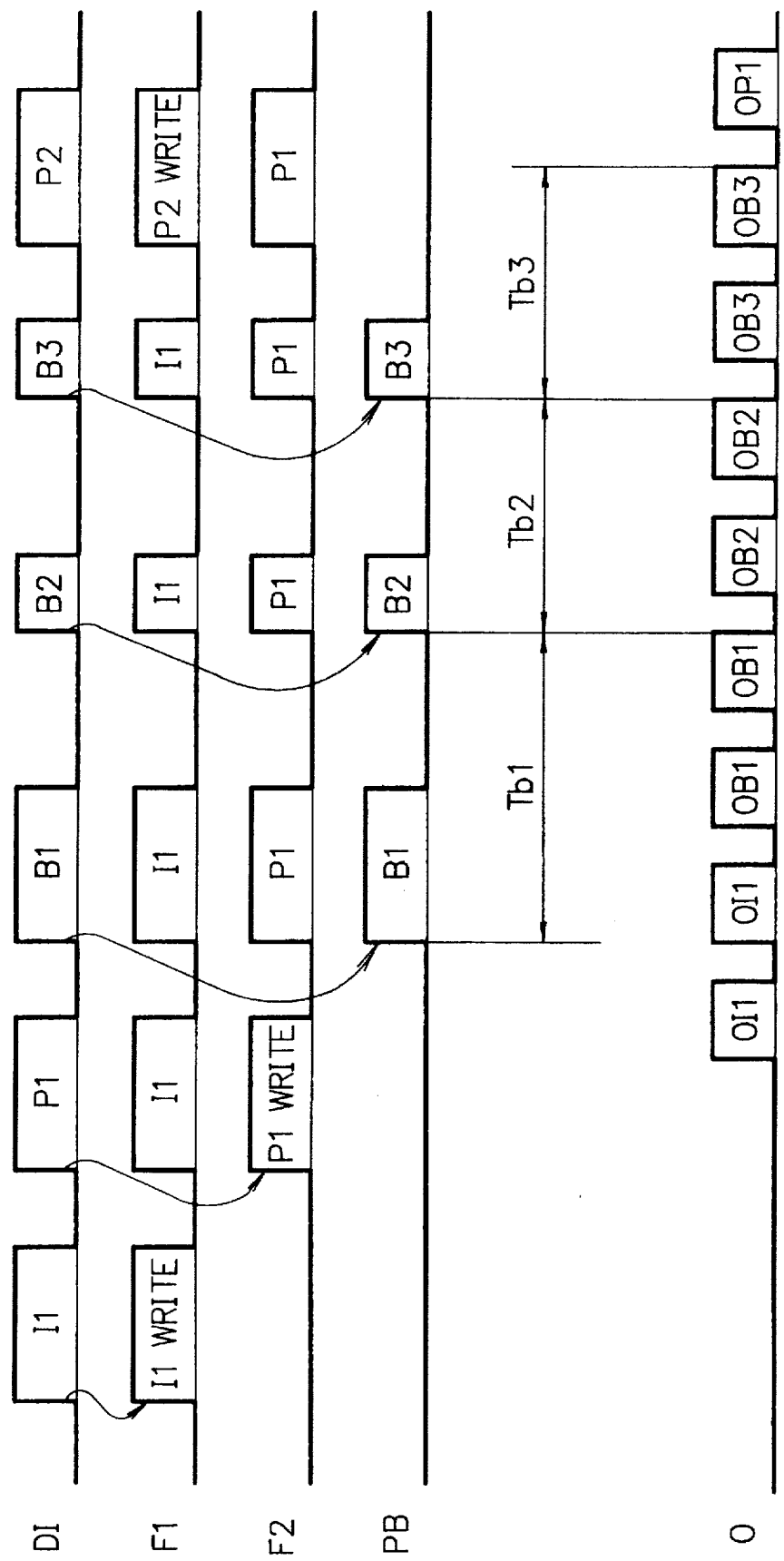
FIGS. 4 and 5 are time charts of various signals in the system of FIG. 3, respectively.
Figure 5:
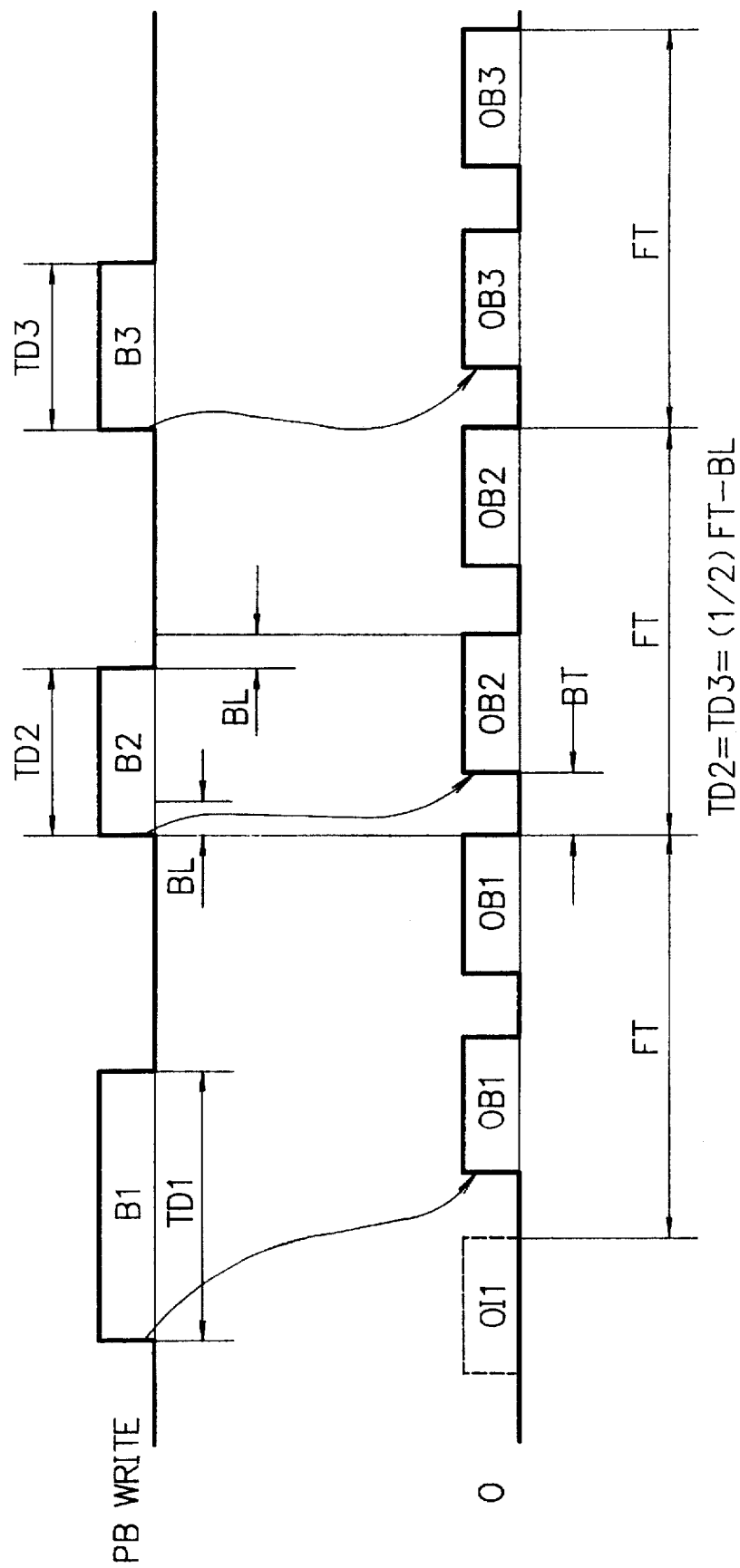

FIGS. 4 and 5 show time charts of various signals in the system of FIG. 3, assuming that M=4.

Again letting Ip, Pq and Br be a p-th I picture, a qth P picture and an r-th B picture in a GOP, it is assumed that an input code sequence DI formatted to the MPEG has a picture sequence such that:

"I1-P1-B1-B2-B3-P2 ...".

Like the system of FIG. 1, in accordance with the control by the timing signal K, there are MC-prediction decoded I, P and B pictures (i.e. PI, PP and PB), of which the I and P pictures (e.g. I1, P1, P2, ...) are written by a block scan at a rate of 30 fields (30 frames) per second, alternately into the frame memories 8 and 9, wherefrom they are read by a raster scan at a rate of 60 fields (30 frames) per second, alternately providing data F1, F2 corresponding to reference pictures for MC and data 0 (e.g. 0I1), 0 (e.g. 0P1) corresponding to reproduced pictures to be output.

The B pictures (e.g. B1, B2, B3, ...) are each written to the scan memory 10, wherefrom it is read as data 0B (e.g. 0B1, 0B2, 0B3) to be output.

When the picture type signal PT supplied from the decoder 1 is changed, indicating a B picture, the timing selector 121 responds thereto to generate the timing signal KB in place of the timing signal K, driving the system to execute a series of associated decoding steps of the B picture at a high speed, securing a necessary period (e.g. Tb1, Tb2, Tb3) for writing data of the B picture to the scan memory 10 and reading therefrom the same, to avoid an occurrence of an overlap time TL between neighboring periods (eg. Tb1–Tb2, Tb2–Tb3) for processing B pictures. Such effects may be achieved via an unshown CPU responsible for the timing signal KB, or directly the signal KB that may act on each associated section or unit.

More specifically, as shown in FIG. 5, a B1 picture is written to the scan memory 10 in a timing designated by the timing signal K difining a normal decoding perocess time TD1. In a rear half of the writing time TD1, a raster scan starts reading data 0B1 of the written B1 picture, for the first time. In concurrence therewith, the timing selector 121 of the timing signal generator 12A responding to the picture type signal PT, as it has been changed to be indicative of the B picture, switches the timing signal from K to KB, whereby a B2 picture is MC-prediction decoded at a high speed. As a result, upon completion of a second reading of the data 0B1, a writing of the decoded B2 picture starts.

To effectively avoid an overlap between neighboring B picture write/read process periods Tb1 and Tb2, letting BL be a fraction of a block scan that corresponds to one block line (i.e. one block line period), a writing of a B2 picture is required to start at least one BL before a first scan for reading data 0B2 of the written B2 picture and end one BL before an end of the first reading of the B2 picture.

In this respect, a blanking period BT, i.e. a data output interruption period between the second output of the data 0B1 and the first output of the data 0B2, is apparently longer than the one block line period BL, meeting a write start condition to the scan memory 10.

Therefore, to avoid an overlap between neighboring B picture write/read process periods, a writing period TD2 of B2 picture as well as that TD3 of B3 picture may preferably be set to a half of one-frame period FT minus the one block line period BL, i.e. (½)FT−BL, whereto the timing signal KB is designed, permitting a high speed decoding process, so that the scan memory 10 mere one in number can serve for a complete write/read operation of B picture.

Necessary storage capacity for frame and scan memories (=3 frames) is calculatable such that:

352 (dots)×288 (lines)×8 (bits)×1.5 ($Y+Cb+Cr$)×3 (frames)=3,649,536 (bits).

so that a single 4M RAM affords a competent use.

According to the embodiment of FIG. 3, therefore, a possible capacity reduction to a one-frame storage permits an effective reduction in a total memory capacity, resulting in a size-reduced inexpensive system.

Figure 7:
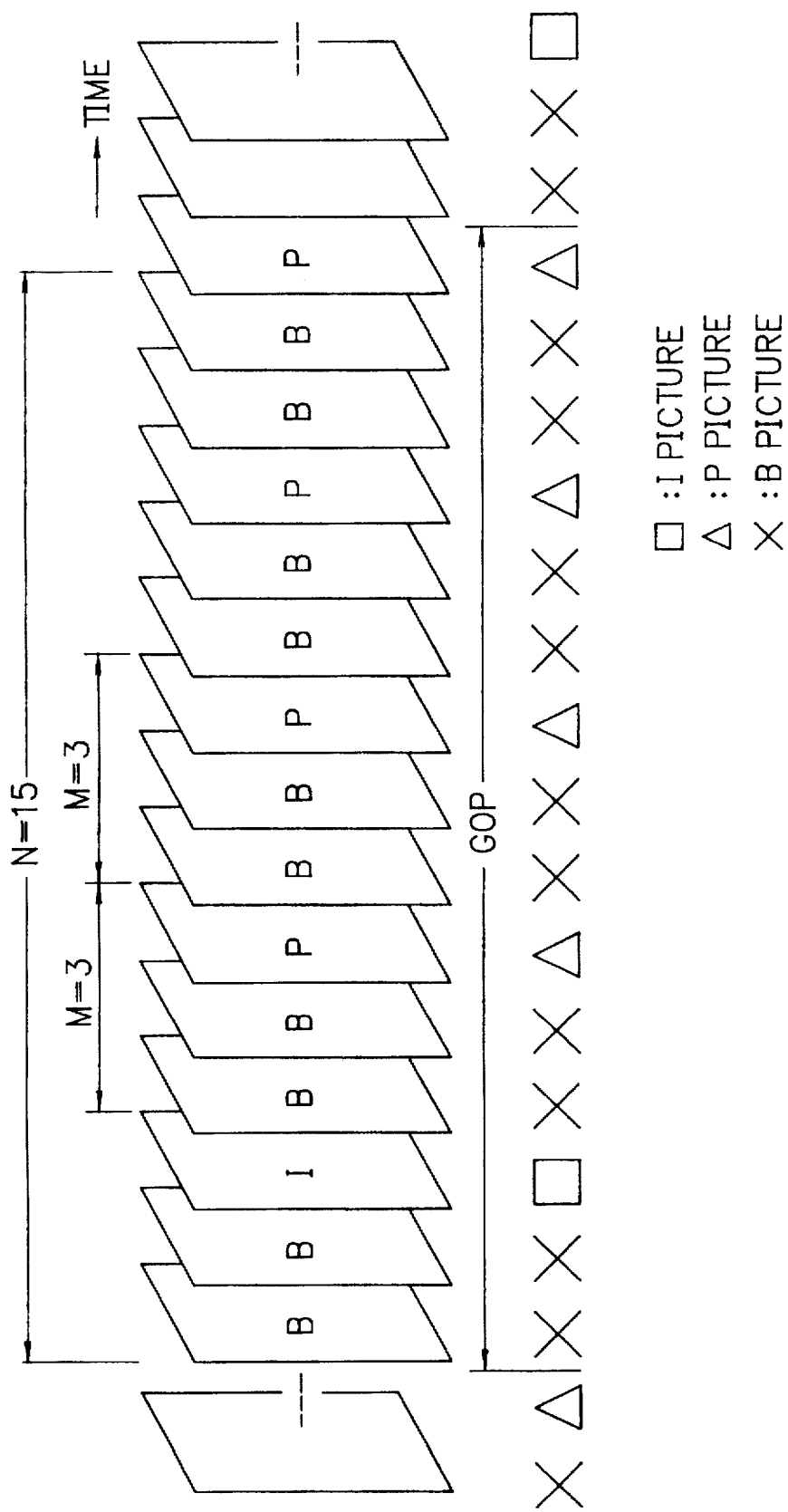
FIG. 7 is an illustration of a sequence of three types of pictures in a GOP of the MPEG data of FIG. 6.
Figure 8:
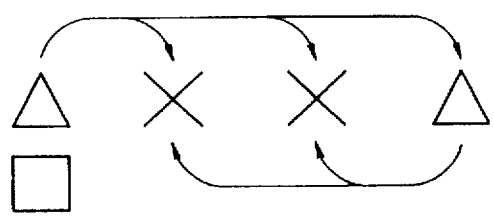
FIG. 8 is a diagram describing directions of interframe MC predictions.

Incidentally, the MPEG is an internationally known standard. However, for a quick reference, FIGS. 6 to 8 are appendix hereto.

Figure 6:
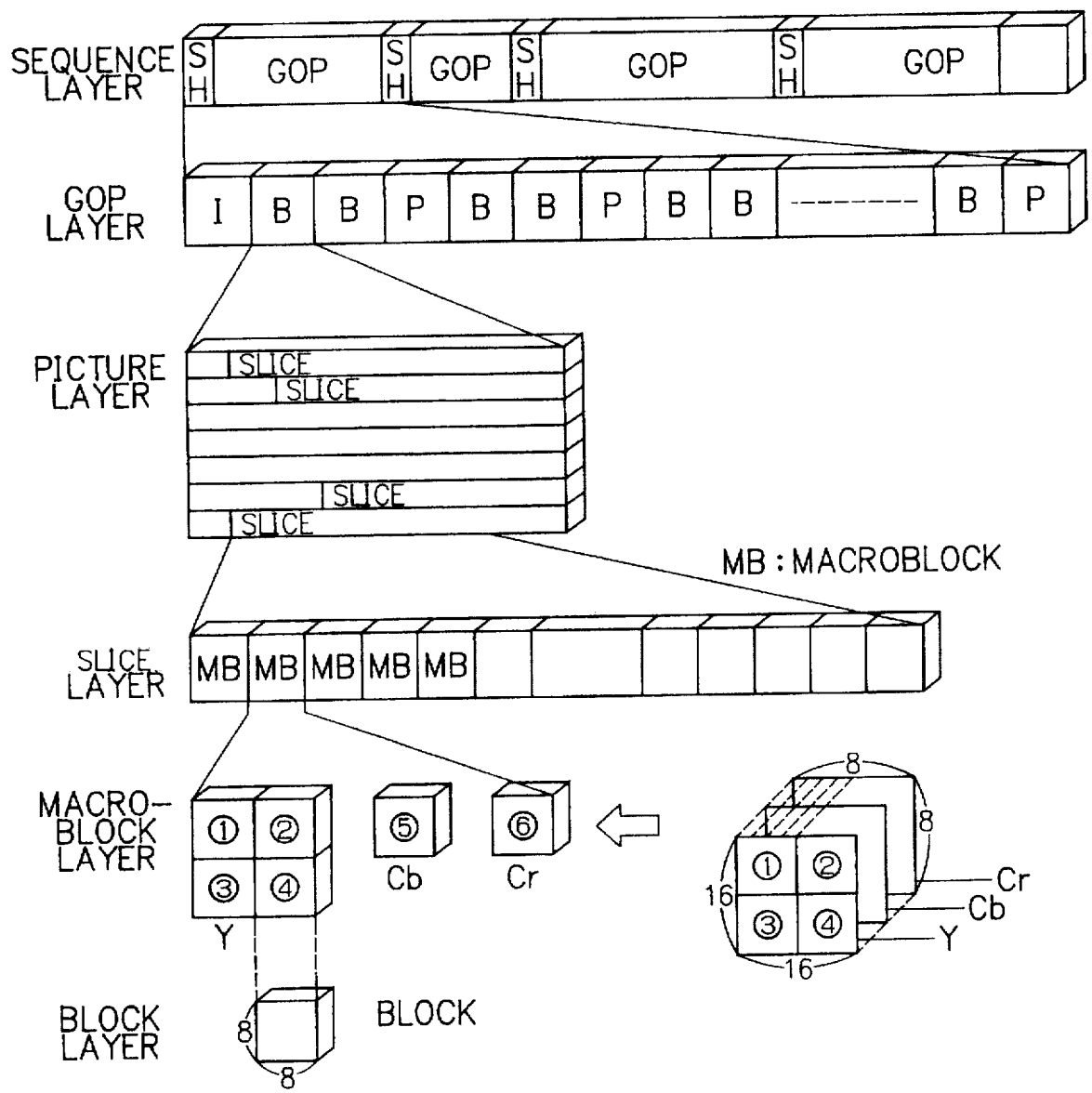
FIG. 6 is an illustration of a layered structure of MPEG data.

FIG. 6 is an illustration of a layered structure of MPEG data, of which characteristics are listed in Tables 1 to 4 below.

TABLE 1(1/2)

| MPEG1 Coded Data | | | |
|---|---|---|---|
| | Data | Bits | Code |
| Sequence layer | | | |
| SHC | Sequence Header Code | 32 | 000001B3(H) |
| HS | Horizontal Size | 12 | |
| VS | Vertical Size | 12 | |
| PAR | Pel Aspect Ratio | 4 | |
| PR | Picture Rate | 4 | |
| BR | Bit Rate | 18 | |
| MB | Marker Bit | 1 | |
| VBS | VBV(Video Buffering Verifier) Buffer Size | 10 | |

TABLE 1(2/2)

| MPEG1 Coded Data | | | |
|---|---|---|---|
| | Data | Bits | Code |
| Sequence layer | | | |
| CPF | Constrained Parameters Flag | 1 | |
| LIQM | Load Intra Quantize Matrix | 1 | |
| IQM | Intra Quantizer Matrix | 8×64 | |
| LNIQM | Load Non Intra Quantizer Matrix | 1 | |
| MIQM | Non Intra Quantizer Matrix | 8×64 | |
| ESC | Extension Start Code | 32 | 000001B5(H) |
| SED | Sequence Extension Data | 8×n | |
| UDSC | User Data Start Code | 32 | 000001B2(H) |
| UD | User Data | 8×n | |
| SED | Sequence End Code | 32 | 000001B7(H) |

TABLE 2(1/3)

MPEG1 Coded Data

| Data | | Bits | Code |
|---|---|---|---|
| Gop layer | | | |
| GSC | Group Start Code | 32 | 000001B8(H) |
| TC | Time Code | 25 | |
| CG | Closed GOP | 1 | |
| BL | Broken Link | 1 | |
| ESC | Extension Start Code | 32 | 000001B5(H) |
| GED | Group Extension Data | 8×n | |
| UDSC | User Data Start Code | 32 | 000001B2(H) |
| UD | User Data | 8×n | |

TABLE 2(2/3)

MPEG1 Coded Data

| Data | | Bits | Code |
|---|---|---|---|
| Picture layer | | | |
| PSC | Picture Start Code | 32 | 00000100(H) |
| TR | Temporal Reference | 10 | |
| PCT | Picture Coding Type | 3 | |
| VD | VBV Delay | 16 | |
| FPFV | Full Pel Forward Vector | 1 | |
| FFC | Forward f Code | 3 | |
| FPBV | Full Pel Backward Vector | 1 | |
| BFC | Backward f Code | 3 | |

TABLE 2(3/3)

MPEG1 Coded Data

| Data | | Bits | Code |
|---|---|---|---|
| Picture layer | | | |
| EBP | Extra Bit Picture | 1×n | |
| EIP | Extra Information Picture | 8×n | |
| EBP | Extra Bit Picture | 1 | |
| ESC | Extension Start Code | 32 | 000001B5(H) |
| PED | Picture Extension Data | 8×n | |
| UDSC | User Data Start Code | 32 | 000001B2(H) |
| UD | User Data | 8×n | |

TABLE 3

MPEG1 Coded Data

| Data | | Bits | Code |
|---|---|---|---|
| Slice layer | | | |
| SSC | Slice Start Code | 32 | 00000101(H) |
| QS | Quantizer Scale | 5 | 000001AF(H) |
| EBS | Extra Bit Slice | 1×n | |
| EIS | Extra Information Slice | 8×n | |
| EBS | Extra Bit Slice | 1 | |

TABLE 4(1/3)

MPEG1 Coded Data

| Data | | Bits | Code |
|---|---|---|---|
| Macroblock layer | | | |
| MB STUFF | Macroblock Stuffing | 11 | 00000001111 |
| MB ESC | Macroblock Escape | 11 | 00000001000 |
| MBAI | Mmacroblock Address Increment | 1–11 | |
| MBTYPE | Macroblock Type | 1–8 | |
| QS | Quantizer Scale | 5 | |

TABLE 4(2/3)

MPEG1 Coded Data

| Data | | Bits | Code |
|---|---|---|---|
| Macroblock layer | | | |
| MHF | Motion Horizontal Forward Code | 1–11 | |
| | Motion Horizontal Forward r | 1–6 | |
| MVF | Motion Vertical Forward Code | 1–11 | |
| | Motion Vertical Backward r | 1–6 | |
| MHB | Motion Horizontal Backward Code | 1–11 | |
| | Motion Horizontal Backward r | 1–6 | |
| MVB | Motion Vertical Backward Code | 1–14 | |
| | Motion Vertical Backward r | 1–6 | |
| CBP | Coded Block Pattern | 3–9 | |
| EOM | End of Macroblock | 1 | 1 |

TABLE 4(3/3)

MPEG1 Coded Data

| Data | | Bits | Code |
|---|---|---|---|
| Block layer | | | |
| DDSL | DCT DC Size Luminance | 2–7 | |
| DDSC | DCT DC Size Chrominance | 2–8 | |
| DDCD | DCT DC Differential | 1–8 | |
| DCF | DCT Coefficient First | 2–28 | |
| DCN | DCT Coefficient Next | 3–28 | |
| EOB | End of Block | 2 | |

FIG. 7 is an illustration of a sequence of three types of pictures in a GOP of the MPEG data of FIG. 6.

FIG. 8 is a diagram describing directions of interframe MC predictions.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A video decoder system comprising:

decoder means for Huffman-decoding a set of Huffman-coded picture data and outputting Huffman-decoded data, a first selection signal and a second selection signal;

inverse quantization means, connected to said decoder means, for inverse-quantizing the Huffman-decoded data and outputting inverse-quantized data;

inverse discrete cosine transformation means, connected to said inverse quantization means, for inverse-discrete-cosine-transforming the inverse-quantized data and outputting a set of first data;

adder means connected to said decoder and said inverse discrete cosine transformation means;

means, connected to said adder means, for generating prediction data sets, said adder means being responsive to said first selection signal from the decoder means, for adding one of said prediction data sets to the set of first data and outputting first, second and third picture data sets representing first, second and third picture types, respectively;

first and second frame memories, connected to said adder means, for alternatively storing the first and second picture data sets in frames, said first and second picture data sets being stored in said first and second frame memories in a block scan order, said first and second picture data sets being read from said first and second frame memories in a raster scan order;

a third frame memory, connected to said adder means, for storing the third picture data set in frames in said block scan order, said third picture data set being read from said third frame memory in said raster scan order; and timing signal generation means, connected to said decoder means, for generating timing signals for a timing control of the video decoder system, wherein the timing signal generation means includes a timing signal select means responsive to said second selection signal, indicating one of the first, second and third picture types, for selectively generating one of a first timing signal of said timing signals for decoding the first and second picture data sets and a second timing signal of said timing signals for decoding the third picture data set within a predetermined period of time.

2. A video decoder system according to claim 1, wherein:

the block scan comprises a sequential line scan;

the raster scan comprises a double-speed line scan; and the predetermined period comprises at least a half of a scan period of one of the frames minus a period for one line of the block scan.

3. A video decoder system comprising:

a decoder for Huffman-decoding a set of Huffman-coded picture data and outputting Huffman-decoded data, a first selection signal and a second selection signal;

an inverse quantization unit, connected to said decoder, for inverse-quantizing said Huffman-decoded data and outputting inverse-quantized data;

an inverse discrete cosine transformer, connected to said inverse quantization unit, for inverse-discrete-cosine-transforming said inverse-quantized data and outputting a set of first data;

an adder, connected to said decoder and said inverse discrete cosine transformer;

motion compensation predictors, connected to said adder, for generating prediction data sets, said adder being responsive to said first selection signal from said decoder, for adding one of said prediction data sets to said set of first data and outputting first, second and third picture data sets representing first, second and third picture types, respectively;

first and second frame memories, connected to said adder, for alternatively storing said first and second picture data sets in frames, said first and second picture data sets being stored in said first and second frame memories in a block scan order, said first and second picture data sets being read from said first and second frame memories in a raster scan order;

a third frame memory, connected to said adder, for storing said third picture data set in frames in said block scan order, said third picture data set being read from said third frame memory in said raster scan order; and a timing signal generator, connected to said decoder, for generating timing signals for timing control of said video decoder system, wherein said timing signal generator includes a timing signal selector responsive to said second selection signal for selectively generating one of a first timing signal of said timing signals for decoding said first and second picture data sets and a second timing signal of said timing signals for decoding said third picture data set within a predetermined period of time.

4. A video decoder system according to claim 3, wherein:

said block scan comprises a sequential line scan;

said raster scan comprises a double-speed line scan; and said predetermined period comprises at least a half of a scan period of one of said frames minus a period for one line of said block scan.

5. A timing signal generator for generating timing signals for control of a video decoder system, said video decoder system including: means for decoding a video signal into a first picture data set, a second picture data set and a third picture data set, said decoding means outputting a selection signal; first and second frame memories, connected to said decoding means, for storing said first picture data set and said second picture data set; and a third frame memory, connected to said decoding means, for storing said third picture data set, said third frame memory comprising a single memory for processing said third picture data set, within said predetermined time, without a delay, said timing signal generator comprising:

a timing signal selector, responsive to said selection signal, for selectively generating one of a first timing signal of said timing signals for decoding said first and second picture data sets and a second timing signal of said timing signals for decoding said third picture data set within a predetermined period of time.

* * * * *